(12) United States Patent
Johnson

(10) Patent No.: US 8,164,983 B2
(45) Date of Patent: Apr. 24, 2012

(54) FISH FINDER

(76) Inventor: David A. Johnson, Simonton, TX (US)

( * ) Notice: Subject to any disclaimer, the term of this patent is extended or adjusted under 35 U.S.C. 154(b) by 403 days.

(21) Appl. No.: 12/399,693

(22) Filed: Mar. 6, 2009

(65) Prior Publication Data

US 2010/0226209 A1 Sep. 9, 2010

(51) Int. Cl.
- *G01S 15/96* (2006.01)
- *G01S 15/02* (2006.01)
- *G01S 15/10* (2006.01)

(52) U.S. Cl. .......................... 367/106; 367/11
(58) Field of Classification Search .................. 367/106, 367/107, 103, 88, 11, 7, 124, 111
See application file for complete search history.

(56) References Cited

U.S. PATENT DOCUMENTS

| | | | |
|---|---|---|---|
| 4,829,492 A | 5/1989 | Choi et al. | |
| 5,115,416 A | 5/1992 | Gehlbach et al. | |
| 5,184,330 A * | 2/1993 | Adams et al. | 367/111 |
| 5,377,104 A | 12/1994 | Sorrells et al. | |
| 5,408,874 A | 4/1995 | Fleck, Sr. et al. | |
| 5,675,552 A | 10/1997 | Hicks et al. | |
| 5,963,508 A | 10/1999 | Withers | |
| 6,130,641 A | 10/2000 | Kraeutner et al. | |
| 6,529,832 B1 | 3/2003 | Kerekes | |
| 7,660,188 B2 | 2/2010 | Meldahl | |
| 2001/0037178 A1 | 11/2001 | Bush | |
| 2002/0128779 A1 | 9/2002 | Kerekes et al. | |
| 2002/0169559 A1 | 11/2002 | Onyia et al. | |
| 2003/0004648 A1 | 1/2003 | Huffman et al. | |
| 2003/0026166 A1 | 2/2003 | Aronstam | |
| 2003/0078734 A1 | 4/2003 | Ozbek | |
| 2004/0054479 A1 | 3/2004 | Trickett | |
| 2004/0145969 A1 | 7/2004 | Bai et al. | |
| 2004/0225444 A1 | 11/2004 | Young et al. | |

(Continued)

FOREIGN PATENT DOCUMENTS

| | | |
|---|---|---|
| EP | 175026 A1 | 3/1986 |
| WO | 9919749 A1 | 4/1999 |
| WO | 0023821 A1 | 4/2000 |
| WO | 0118562 A1 | 3/2001 |
| WO | 2008151371 A1 | 12/2008 |
| WO | 2009032996 A2 | 3/2009 |

OTHER PUBLICATIONS

Notification of transmittal of the international search report and the written opinion of the international searching authority, or the declaration dated Jul. 7, 2010 based on PCT/US2010/026304 filed Mar. 5, 2010; 7 pages, Form PCT/ISA/210 and PCT/ISA/237.

*Primary Examiner* — Daniel Pihulic
(74) *Attorney, Agent, or Firm* — Arnold & Knobloch, L.L.P.; Charles Knobloch

(57) ABSTRACT

A method, system, and apparatus are provided for focused ultrasonic acoustic imaging of objects within a body of water. Echo soundings are collected, produced by an ultrasonic transmitter and detected by an ultrasonic receiver. Spatial location information of the transmitter and receiver is collected and associated with each echo sounding. A focused signal spatial location is selected at a desired output location. One or more of the collected soundings are selected. An echo signal from each selected sounding is selected. The signal selection is determined by a calculation of which signal from the selected sounding scattered from an object at the selected focused signal spatial location. A focused echo signal is formed by combining the selected signals for the selected focused signal location. The focused signals are graphed, based on their respective selected focused signal spatial locations, producing a focused image.

27 Claims, 7 Drawing Sheets

U.S. PATENT DOCUMENTS

| | | |
|---|---|---|
| 2004/0249860 A1 | 12/2004 | Stechschulte et al. |
| 2004/0252587 A1 | 12/2004 | Melese et al. |
| 2005/0007881 A1 | 1/2005 | Zimmerman et al. |
| 2005/0007882 A1 | 1/2005 | Bachelor et al. |
| 2008/0080317 A1 | 4/2008 | Inouchi et al. |
| 2009/0010104 A1 | 1/2009 | Leaney |
| 2009/0059721 A1 | 3/2009 | Simon |
| 2009/0248312 A1 | 10/2009 | Hsu et al. |
| 2010/0036614 A1 | 2/2010 | Zuercher |
| 2010/0226209 A1* | 9/2010 | Johnson .................. 367/106 |

* cited by examiner

FISH FINDER

FIELD OF THE INVENTION

The invention relates to the field of fish finders. More specifically, the present invention is a method, apparatus, and system for forming focused images of fish and other submerged objects in water.

BACKGROUND

Fish finders typically use an acoustic signal that is pulsed into the water. The presence of fish in the water form obstacles to the acoustic signal. Some of the acoustic signal will reflect off the fish and return to an acoustic receiver designed to listen for the returning acoustic signal(s). It is possible to approximate the depth of the fish by recording the time taken for the return of the acoustic signal. The results can be displayed graphically such that longer return times are plotted downward from an imaginary sea level or water surface.

After a period of time, after listening for any returning acoustic signals, another pulse of the acoustic signal is repeated. The period of time for listening is repeated. Assuming that the boat has moved since the last sounding, it is possible to graphically simulate a cross section of the water under the boat. This is accomplished by displaying the results of the second listening alongside the first listening. The process of applying an acoustic signal, then listening, is repeated and the results of the listenings are sequentially plotted along side each other. The result is a plot having the appearance of a cross section of the water under the boat. Any reflections from fish will display as markings of the returned acoustic signal at various depths. The reflection off the bottom of the water column will show up as a generally continuous reflection signal often below the base of the echo signals due to fish.

The acoustic source is typically designed to project the acoustic signal mostly in a downward (or other pre-determined) direction, reducing the amount of acoustic energy going in other directions. The reason for this is that reflections of fish that are not directly under the acoustic source will produce a reflection that will be received by the acoustic receiver. Those fish will appear, incorrectly, to be under the location of the acoustic source and will also appear to be deeper than they actually are. In some instances, the fish will even appear to be below the water bottom. This is an undesirable feature, as false positioning of the fish in the water decreases the usefulness of the fish finder.

Even with efforts to directionally transmit the acoustic signal only downward, a particular sounding will "see" fish that are not yet directly under the source. Since the acoustic source is not yet directly over the fish, the reflection or echo from the fish will appear to be deeper than the actual depth of the fish. As the acoustic source moves directly over the fish, the echo from the fish will appear shallower, approaching the fish's true depth. When the acoustic source is directly over the fish, the apparent depth will match the true depth and will appear shallower than any of the deeper echoes. As the acoustic source moves away from the fish, the echoes will again appear deeper than the shallowest, true depth echo. The result is that a reflection from a fish will not appear as a single spot on the plotting, but will appear as a concave downward curve.

Similarly, any object resting on the bottom of the water column (such as rocks, weeds, etc.) or any sharp discontinuity or structure in the bottom of the water column will not be sharply imaged by current techniques. This is because the sound energy generally spreads out over a large area as it travels through the water (often described as a "cone" of energy). Thus, sound energy is reflected from objects not just directly beneath the source, but from objects in a large area around the source location. This has the practical effect of severely limiting the ability of the fish finder to sharply define bottom structure of interest to fishermen.

There is a need to improve the resolution of echoes from fish by diminishing the appearance of the concave downward curves and further resolving a fish echo into a more focused image on the plot. Similarly, there is a need to improve the resolution of echoes from bottom structure into sharp images of the actual structure of the water bottom. Sophisticated processing of acoustic signals are used in seismic imaging for petroleum exploration. These processing techniques are expensive, and designed for proper imaging of geologic formations under the surface of the water bottom. In seismic imaging, the reflected signal before the water bottom is typically muted away. The frequencies, spacings and design of the sources and receivers are typically not suited for detection of fish in the water. The myriad of processing steps to recover information from deep in the sediments and rocks remove, rather than recover, whatever remaining fish information may be in the soundings. There is a need for a different processing method that can be practically and economically applied to the particular requirements necessary to resolve fish locations, characteristics, and depths.

SUMMARY OF THE INVENTION

In a first set of examples, a method for ultrasonic acoustic imaging of objects within a body of water is disclosed, the method includes the steps of: collecting a plurality of echo soundings over a period of time in an area of interest, the soundings produced by an ultrasonic transmitter and detected by one or more ultrasonic receivers, wherein each echo sounding includes a plurality of echo signals, the echo signals corresponding to an apparent vertical depth, thereby forming an unfocused image; collecting spatial location information of the transmitter and receiver, where the collected spatial location information is associated with each collected echo sounding; and forming a focused image. The step of forming a focused image further includes the steps of: selecting a focused signal spatial location where the selected focused signal spatial location is defined relative to the collected spatial location information associated with the echo soundings; selecting one or more echo soundings from the plurality of echo soundings; selecting an echo signal from each selected echo sounding, whereby the echo signal selection is determined by a calculation of which echo signal from the selected echo sounding corresponds to a focused signal occurring at the selected focused signal spatial location, where the calculation is based on the selected focused signal spatial location and on the collected spatial information associated with the selected echo sounding; combining the selected echo signals, whereby a focused echo signal with improved signal to noise ratio and correct spatial location is formed; and graphing the focused echo signal based on the selected focused signal spatial location, whereby a focused image is produced.

In another example, the step of collecting a plurality of echo soundings further includes the steps of: converting the echo signals into digital values for storage in a computer-readable medium; and recording the digital values into a computer-readable medium.

In another example, the method further includes the step of transmitting short bursts of an ultra-sonic acoustic carrier wave into the water. In another example, the method further includes the step of transmitting a complex wave-shape ultrasonic acoustic wave into the water. In another example, the method further includes the step of transmitting a wide-bandwidth ultra-sonic acoustic wave into the water.

In another example, the step of forming a focused image further includes the steps of: recording a series of times, locations, speeds, altitudes, and headings from a location device; applying smoothing corrections to the recorded series, whereby calculated locations are produced; determining the location of the transmitter and receiver for each collected echo sounding from the calculated locations, whereby a determined location is produced; and where the calculation of which echo signal from the selected echo sounding is further based upon said determined location.

In another example, the method further includes the step of preconditioning the echo soundings. In a further example, the step of preconditioning the echo soundings further includes the step of compensating the signal strength of echo signals of the echo sounding for wave front spreading. In a further example, the step of preconditioning the echo soundings further includes the step of bandpass filtering the echo sounding. In a further example, the step of preconditioning the echo soundings further includes the step of waveform shaping the echo signals of the echo sounding. In a further example, the step of preconditioning the echo soundings further includes the steps of estimating the relative wave elevation associated with the collected echo sounding; and adjusting the collected spatial location information of the collected echo sounding, based on the estimated relative wave elevation.

In another example, the step of selecting an echo signal from each selected echo sounding further includes the steps of: calculating a distance ($Z_s$) between the selected focused signal spatial location and the spatial location of the transmitter source, extracted from the collected spatial information associated with the selected echo sounding; calculating a distance ($Z_r$) between the selected focused signal spatial location and the spatial location of the receiver, extracted from the collected spatial information associated with the selected echo sounding; calculating a derived vertical depth (DVD) based on the formula:

$$DVD = \tfrac{1}{2} * (Z_s + Z_r);$$

and determining the echo signal from the selected echo sounding having an apparent vertical depth corresponding to said calculated derived vertical depth.

In a second set of examples, a system for ultrasonic acoustic imaging of objects within a body of water is disclosed, the system including: means for collecting a plurality of echo soundings, the soundings produced by an ultrasonic transmitter and detected by one or more ultrasonic receivers, where each echo sounding includes a plurality of echo signals, the echo signals corresponding to an apparent vertical depth, thereby forming an unfocused image; means for collecting spatial location information of the transmitter and receiver, where the collected spatial location information is associated with each collected echo sounding; and means for forming a focused image. The means for forming a focused image further includes: means for selecting a focused signal spatial location where the selected focused signal spatial location is defined relative to the collected spatial location information associated with the echo soundings; means for selecting one or more echo soundings from the plurality of echo soundings; means for selecting an echo signal from each selected echo sounding, whereby the echo signal selection is determined by a calculation of which echo signal from the selected echo sounding corresponds to a focused signal occurring at the selected focused signal spatial location, where the calculation is based on the selected focused signal spatial location and on the collected spatial information associated with the selected echo sounding; means for combining the selected echo signals, whereby a focused echo signal with improved signal to noise ratio and correct spatial location is formed; and means for graphing the focused echo signal based on the selected focused signal spatial location, whereby a focused image is produced.

In another example, the means for collecting a plurality of echo soundings further includes: means for converting the echo signals into digital values for storage in a computer-readable medium; and means for recording the digital values into a computer-readable medium.

In another example, the system includes means for transmitting short bursts of an ultra-sonic acoustic carrier wave into the water. In another example, the system includes means for transmitting a complex wave-shape ultra-sonic acoustic wave into the water. In another example, the system includes means for transmitting a wide-bandwidth ultra-sonic acoustic wave into the water.

In another example, the means for forming a focused image further includes: means for recording a series of times, locations, speeds, altitudes, and headings from a location device; means for applying smoothing corrections to the recorded series, whereby calculated locations are produced; means for determining the location of the transmitter and receiver for each collected echo sounding from the calculated locations, whereby a determined location is produced; and where the calculation of which echo signal from the selected echo sounding is further based upon the determined location.

In another example, the system includes means for preconditioning the echo soundings. In a further example, the means for preconditioning the echo soundings further includes means for compensating the signal strength of echo signals of the echo sounding for wave front spreading. In a further example, the means for preconditioning the echo soundings further includes means for bandpass filtering the echo sounding. In a further example, the means for preconditioning the echo soundings further includes means for waveform shaping the echo signals of the echo sounding.

In a further example, the means for preconditioning the echo soundings further includes: means for estimating the relative wave elevation associated with the collected echo sounding; and means for adjusting the collected spatial location information of the collected echo sounding, based on the estimated relative wave elevation.

In another example, the means for selecting an echo signal from each selected echo sounding further includes: means for calculating a distance ($Z_s$) between the selected focused signal spatial location and the spatial location of the transmitter source, extracted from the collected spatial information associated with the selected echo sounding; means for calculating a distance ($Z_r$) between the selected focused signal spatial location and the spatial location of the receiver, extracted from the collected spatial information associated with the selected echo sounding; means for calculating a derived vertical depth (DVD) based on the formula:

$$DVD = \tfrac{1}{2} * (Z_s + Z_r);$$

and, means for determining the echo signal of the selected echo sounding having an apparent vertical depth corresponding to said calculated derived vertical depth.

In a third set of examples, a computer-readable medium for use with an apparatus for ultrasonic acoustic imaging of objects within a body of water is disclosed, the computer-readable medium including: instructions for collecting a plurality of echo soundings, the soundings produced by an ultrasonic transmitter and detected by one or more ultrasonic receivers, where each echo sounding includes a plurality of echo signals, the echo signals corresponding to an apparent vertical depth, thereby forming an unfocused image; instructions for collecting spatial location information of the transmitter and receiver, where the collected spatial location information is associated with each collected echo sounding; and instructions for forming a focused image. The instruction for forming a focused image further includes: instructions for selecting a focused signal spatial location where the selected focused signal spatial location is defined relative to the collected spatial location information associated with the echo soundings; instructions for selecting one or more echo soundings from the plurality of echo soundings; instructions for selecting an echo signal from each selected echo sounding, whereby the echo signal selection is determined by a calculation of which echo signal from the selected echo sounding corresponds to a focused signal occurring at the selected focused signal spatial location, where the calculation is based on the selected focused signal spatial location and on the collected spatial information associated with the selected echo sounding; instructions for combining the selected echo signals, whereby a focused echo signal with improved signal to noise ratio and correct spatial location is formed; and instructions for graphing the focused echo signal based on the selected focused signal spatial location, whereby a focused image is produced.

In another example, the instructions for collecting a plurality of echo soundings further includes: instructions for converting the echo signals into digital values for storage in a computer-readable medium; and instructions for recording the digital values into a computer-readable medium.

In another example, the computer-readable medium further includes instructions for transmitting short bursts of an ultra-sonic acoustic carrier wave into the water. In another example, the computer-readable medium further includes instructions for transmitting a complex wave-shape ultrasonic acoustic wave into the water. In another example, the computer-readable medium further includes instructions for transmitting a wide-bandwidth ultra-sonic acoustic wave into the water.

In another example, the instructions for forming a focused image further includes: instructions for recording a series of times, locations, speeds, altitudes, and headings from a location device; instructions for applying smoothing corrections to the recorded series, whereby calculated locations are produced; instructions for determining the location of the transmitter and receiver for each collected echo sounding from the calculated locations, whereby a determined location is produced; and where the calculation of which echo signal from the selected echo sounding is further based upon the determined location.

In another example, the computer-readable medium further includes instructions for preconditioning the echo soundings. In a further example, the instructions for preconditioning the echo soundings further includes instructions for compensating the signal strength of echo signals of the echo sounding for wave front spreading. In a further example, the instructions for preconditioning the echo soundings further includes instructions for bandpass filtering the echo sounding. In a further example, the instructions for preconditioning the echo soundings further includes instructions for waveform shaping the echo signals of the echo sounding. In a further example, the instructions for preconditioning the echo soundings further includes instructions for estimating the relative wave elevation associated with the collected echo sounding; and instructions for adjusting the collected spatial location information of the collected echo sounding, based on the estimated relative wave elevation.

In another example, the instructions for selecting an echo signal from each selected echo sounding further includes: instructions for calculating a distance ($Zs$) between the selected focused signal spatial location and the spatial location of the transmitter source, extracted from the collected spatial information associated with the selected echo sounding; instructions for calculating a distance ($Zr$) between the selected focused signal spatial location and the spatial location of the receiver, extracted from the collected spatial information associated with the selected echo sounding; instructions for calculating a derived vertical depth (DVD) based on the formula:

$$DVD = \tfrac{1}{2} * (Zs + Zr);$$

and, instructions for determining the echo signal of the selected echo sounding having an apparent vertical depth corresponding to the calculated derived vertical depth.

BRIEF DESCRIPTION OF THE DRAWINGS

The present invention is best understood with reference to the attached drawings in which like numerals refer to like elements, and in which.

DETAILED DESCRIPTION OF THE INVENTION

Figure 1:
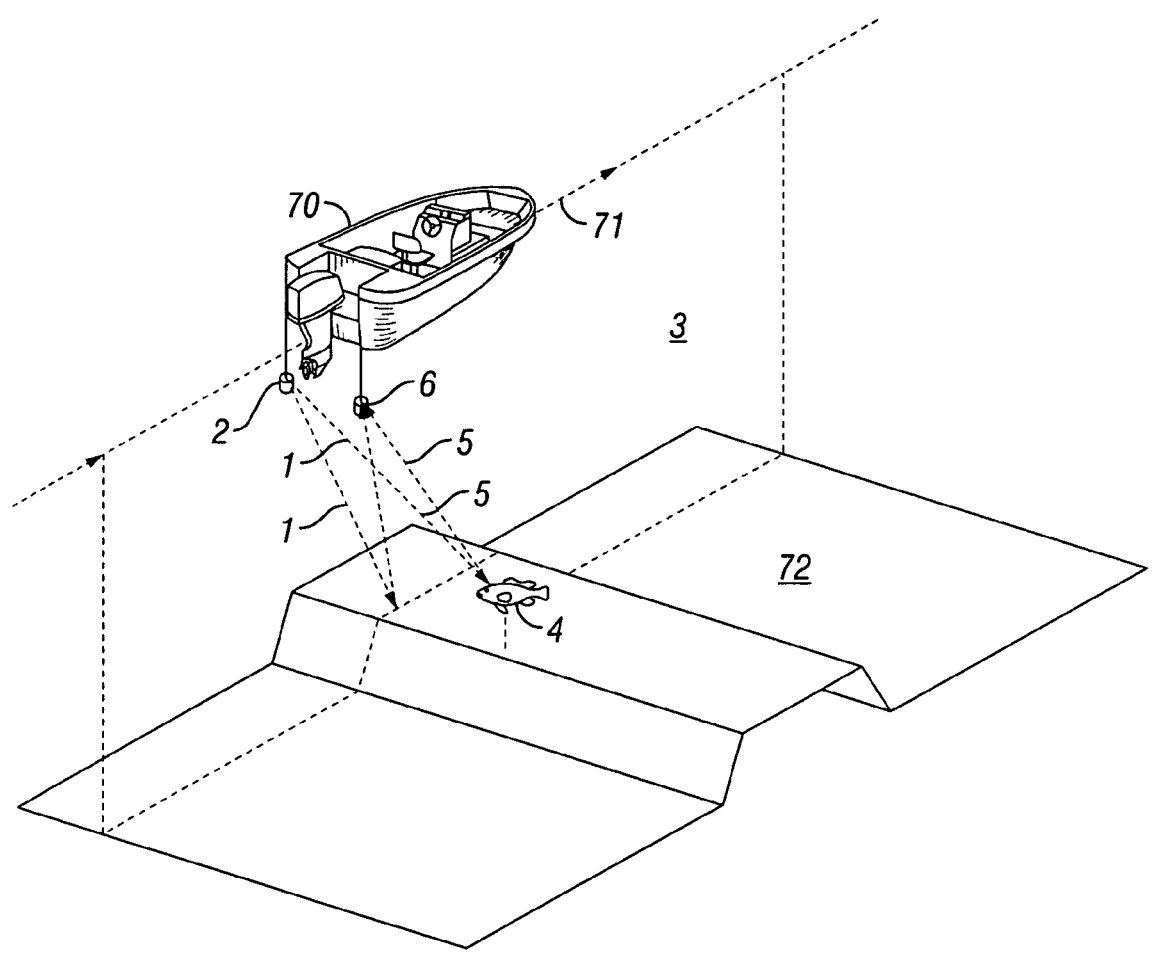
FIG. 1 illustrates a 3-D perspective diagrammatic view for ultrasonic acoustic imaging of objects within a body of water.

FIG. 1 illustrates a diagrammatic view for ultrasonic acoustic imaging of objects within a body of water. In one example, acoustic signals 1 are produced by an ultrasonic transmitter 2 placed in a body of water 3. Ultrasonic transmitter 2 and ultrasonic receiver 6 are deployed in body of water 3 by a boat 70. Boat 70 travels along a course 71. Acoustic signals 1 reflect off of objects 4 and their reflected echoes 5 are detected by an ultrasonic receiver 6. Fish in water are examples of objects 4 that produce reflected echoes. In one example, transmitter 2 and receiver 6 are located in approximately the same spatial location. In another example, transmitter 2 and receiver 6 are located at differing spatial locations. In another example, there are a multitude of ultrasonic transmitters 2 and ultrasonic receivers 6.

Figure 2:
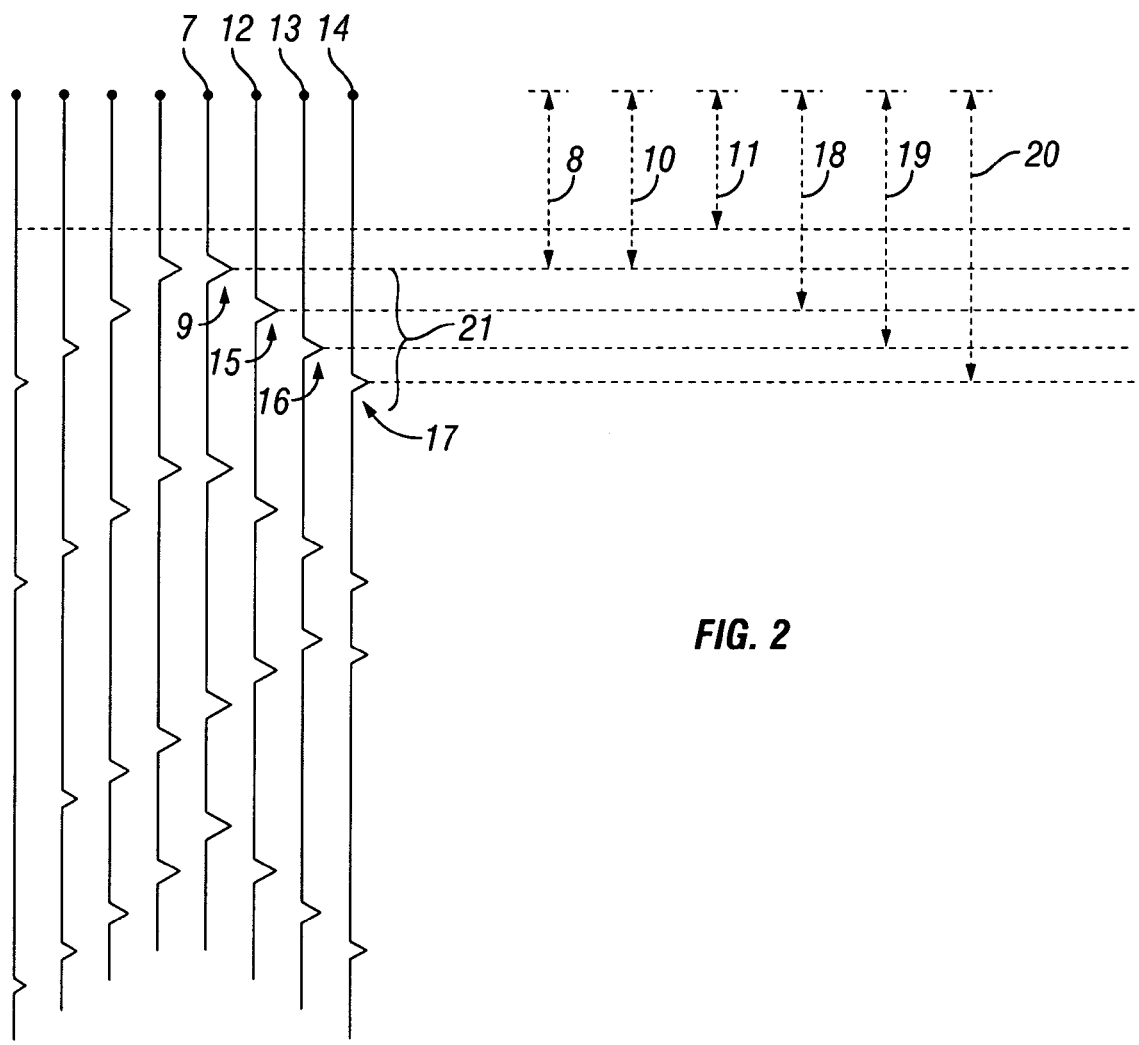
FIG. 2 illustrates a diagrammatic view of echo soundings and collected echo signals.

FIG. 2 illustrates a diagrammatic view of echo soundings and collected echo signals. As shown in FIG. 2, the collection of reflected echoes 5 from a transmitted acoustic signal 1 is an echo sounding 7. The observed time 8 between the transmission of an acoustic signal 1 and the reception of an echo signal 9 from reflected echoes 5 corresponds to the distance of the object from the transmitter 2 and receiver 6. This observed distance corresponds to an apparent vertical depth 10 to the object 4. An object may not be directly underneath the transmitter and receiver. The object may be ahead or behind the line of movement of the transmitter and receiver. Or, the object may be offside from the line of movement of the transmitter and receiver. In such cases, the apparent vertical depth 10 appears deeper than the actual depth 11 to the object. Successive echo soundings 12, 13, 14 produce echo signals 15, 16, 17 of the same object 4 at different apparent vertical depths 18, 19, 20. This collection of echo signals of the same object form an unfocused image 21 of the object. For reflections of objects occurring in water, such as reflections off of fish, the collection of echo signals from successive echo soundings produces an approximately hyperbolic-shaped pattern of the apparent vertical depth of the echo signals.

Figure 3:
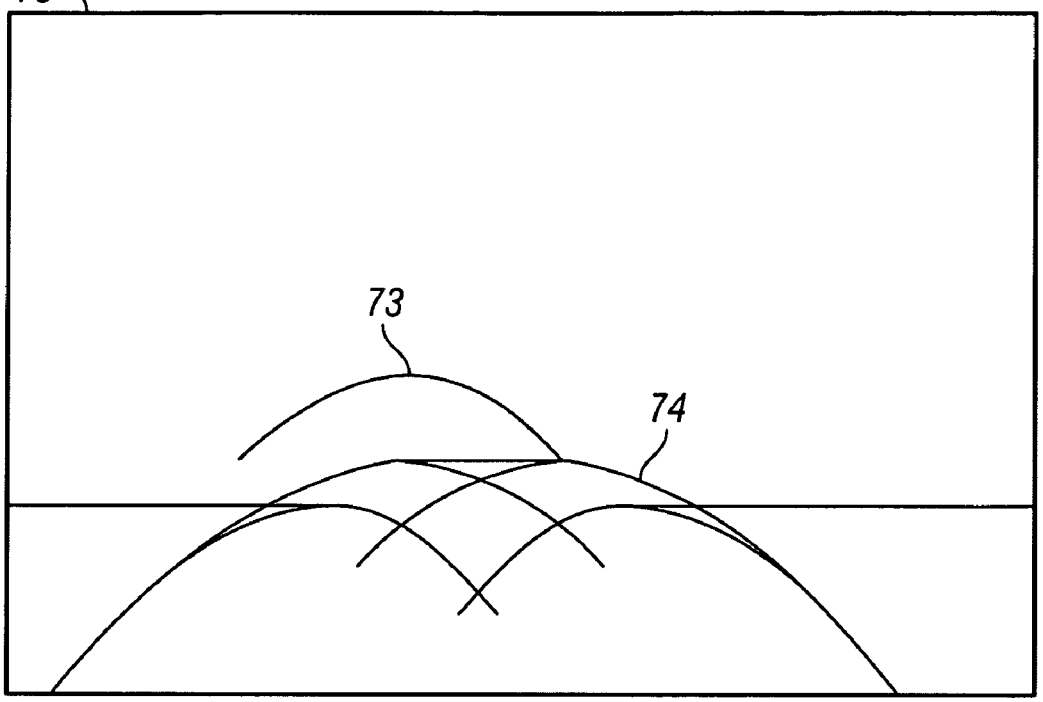
FIG. 3 illustrates an example 2-D fish/depth finder profile, a cross-section view of a display showing echo soundings and collected echo signals representing a fish signal and a complex bottom signal.

FIG. 3 illustrates an example 2-D fish depth finder profile, a cross-section view of a display 75 showing echo soundings and collected echo signals representing a fish signal 73 and a complex bottom signal 74. Display 75 reproduces a plurality of echo soundings 7, 12, 13, 14 (as illustrated in FIG. 2), each echo sounding representing a different lateral spatial location. The plurality of echo soundings as displayed produce an approximately hyperbolic-shaped pattern for each set of successive echo signals that are reflecting off the same object. In one example, one set of successive echo signals is a fish signal 73, representing a fish in the water. In one example, several hyperbolic-shaped patterns form another set of echo signals that is a complex water bottom signal 74, representing the changing elevation of the water bottom. If the location of the fish is laterally disposed far enough away from the source and receiver, it is possible for the fish signal 73 to appear beneath the complex water bottom signal 74.

Figure 4:
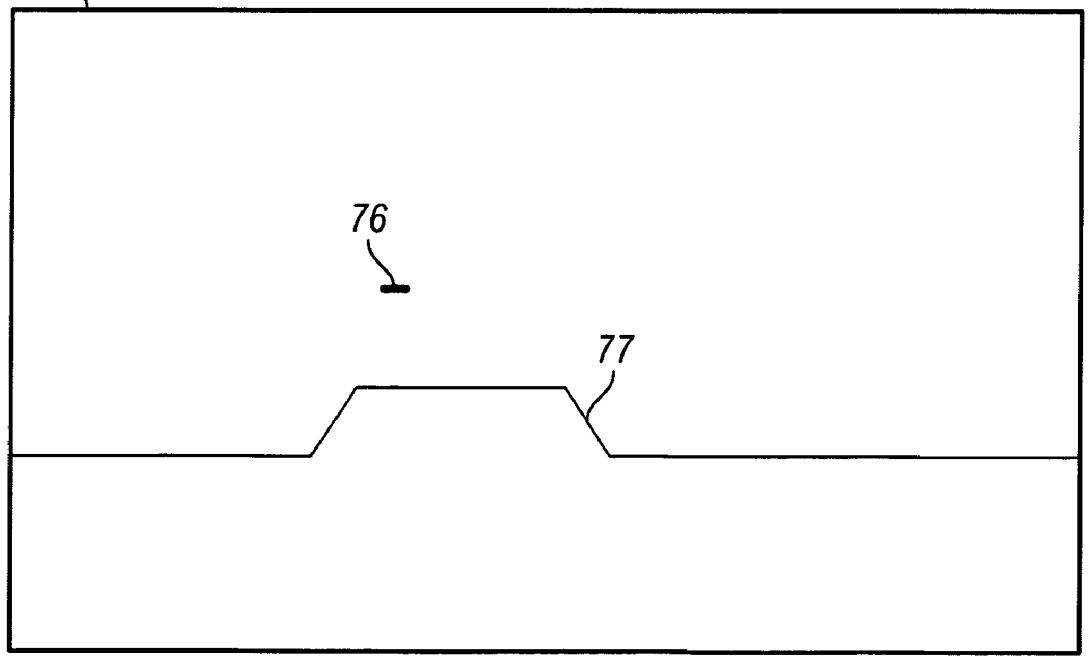
FIG. 4 illustrates an example 2-D focused fish/depth finder profile, a cross-section view of a display showing a focused fish signal and a focused bottom signal.

FIG. 4 illustrates an example 2-D focused fish depth finder profile, a cross-section view of a display 78 showing a focused fish signal 76 and a focused bottom signal 77. The fish signal 73 and complex water bottom signal 74 of FIG. 3 is shown in focused form as a focused fish signal 76 and focused bottom signal 77. The hyperbolic-shaped pattern for each set of successive echo signals is removed and the true location and shape of the bottom and fish are evident.

Figure 5:
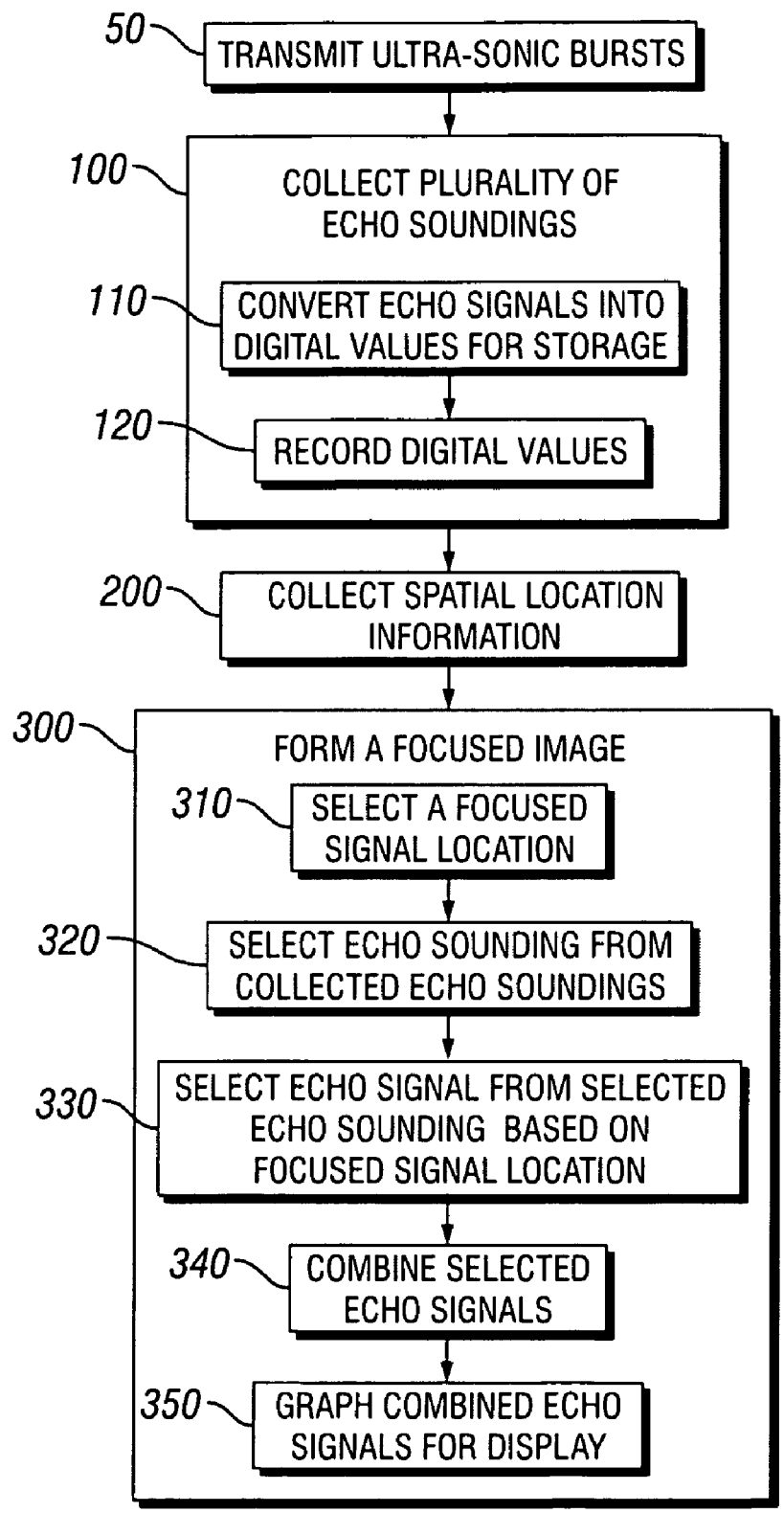
FIG. 5 illustrates a flowchart for ultrasonic acoustic imaging of objects within a body of water.

FIG. 5 illustrates a flowchart for ultrasonic acoustic imaging of objects within a body of water. A plurality of echo soundings are collected, step 100. The soundings are produced by an ultrasonic transmitter and detected by an ultrasonic receiver. Each echo sounding captures one or more echo signals. The echo signals correspond to an apparent vertical depth, thereby forming an unfocused image. Spatial location information of the transmitter and receiver is collected, step 200. The collected spatial location information is associated with each collected echo sounding. A focused image is formed from the captured echo signals, step 300. To form a focused image, a focused signal spatial location is selected, step 310. The focused signal spatial location corresponds to where the focused echo signal will be ultimately displayed to the user on a display. The focused signal spatial location is defined relative to the collected spatial location information that is associated with the echo soundings. One or more echo soundings are selected from the plurality of echo soundings, step 320, said echo soundings having been collected over a period of time from many different boat positions. An echo signal is selected from each selected echo sounding, step 330. The echo signal selection is determined by a calculation of which echo signal from the selected echo sounding corresponds to a focused signal occurring at the selected focused signal spatial location. The calculation is based on the selected focused signal spatial location and on the collected spatial information associated with the selected echo sounding. The selected echo signals are combined, step 340. The combined selected echo signals form a focused echo signal. The focused echo signal is graphed, step 350, for display to a user. The graphing is based on the selected focused signal spatial location, producing a focused image of the objects.

In another example, the echo signals are converted into digital values for storage in a computer-readable medium, step 110. The digital values are then recorded into a computer-readable medium, step 120.

In another example, short bursts of an ultra-sonic acoustic carrier wave are transmitted in order to produce well-defined echo signals, step 50. In another example, a complex waveshape ultra-sonic acoustic wave is transmitted to produce echo signals having a characteristic signature. In another example, a wide-bandwidth ultra-sonic acoustic wave is transmitted to produce echo signals that can be detected and discriminated using various signal processing techniques.

Figure 6:
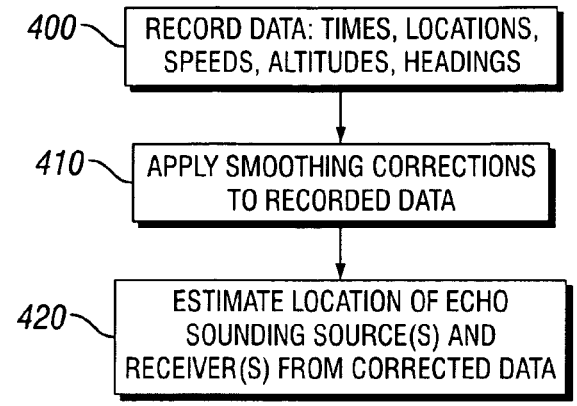
FIG. 6 illustrates flowchart steps for estimating the location of the echo sounding for selection.

FIG. 6 illustrates flowchart steps for estimating the location of the echo sounding for selection. In one example, a focused image is formed by also recording a series of times, locations, speeds, altitudes, and headings from a location device, step 400. In at least one example, recording step 400 occurs prior to combining the selected echo signals, step 340. Smoothing corrections are applied to the recorded time series, step 410, producing calculated locations. In one example, a GPS is used as a location device to gather these data during the acquisition of the echo soundings. The location of the transmitter and receiver is estimated for each collected echo sounding from the calculated locations, step 420, thereby producing an estimated location for the echo sounding. In one example, the selection of the echo signal from within the echo sounding is based upon the estimated location obtained in step 420. In one example, steps 400, 410, or 420 occur as part of step 200 (shown in FIG. 5).

Figure 7:
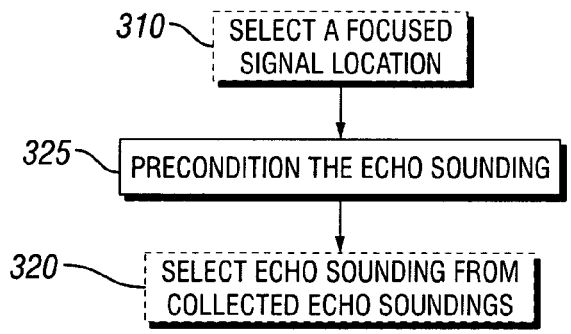
FIG. 7 illustrates a flowchart step for preconditioning an echo sounding.

FIG. 7 illustrates a flowchart step for preconditioning an echo sounding. In another example, the echo soundings are preconditioned prior to combining, step 325. In at least one example, preconditioning step 325 occurs prior to combining the selected echo signals, step 340. In one example, step 325 occurs after step 310 and before step 320. This can be accomplished by either preconditioning all echo soundings or by preconditioning only those echo soundings that are selected. In another example, only those echo signals that are selected undergo preconditioning, depending upon the type of preconditioning performed. For example, an echo signal having a longer travel time will have decreased signal strength due to wave front spreading. In this example, the signal strengths of echo signals are adjusted to compensate for wave front spreading. In a further example, the echo soundings are passed through a band pass filter to increase the signal to noise ratio. In another example, the echo soundings undergo a waveform shaping to compensate for the signature of the transmitted pulse and/or changes to waveform shape caused between the source and receiving apparatus. In a further example, the relative wave elevation (of the surface waves on the body of water) is estimated for the associated collected echo sounding. The collected spatial location information is adjusted for the collected echo sounding, based on the estimated relative wave elevation.

Figure 8:
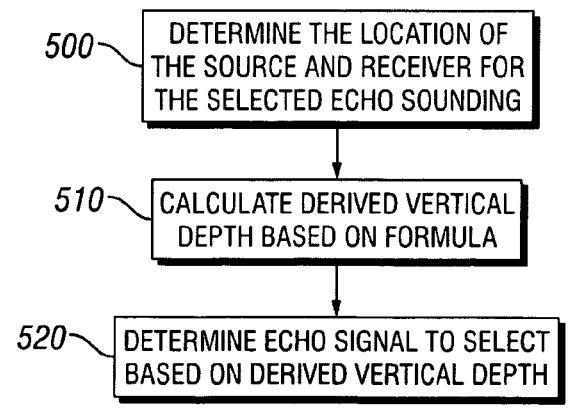
FIG. 8 illustrates flowchart steps for selecting the echo signals.

FIG. 8 illustrates flowchart steps for selecting the echo signals, contributing to meet the requirements of step 330 of FIG. 5. The location of the source and receiver for the selected echo sounding is determined, step 500. In one example, the echo signals from the selected echo sounding are selected by calculating a distance (Zs) between the selected focused signal spatial location (step 310 of FIG. 5) and the spatial location of the transmitter source. A distance (Zr) is also calculated between the selected focused signal spatial location and the spatial location of the receiver. The spatial location of the source and the receiver is extracted from the collected spatial information that has been associated with the selected echo sounding. In one example, a derived vertical depth (DVD) is calculated based on the formula: $DVD = \frac{1}{2} \ast (Zs + Zr)$, step 510. The echo signal of the selected echo sounding having an apparent vertical depth corresponding to the calculated derived vertical depth is then determined, step 520.

Figure 9:
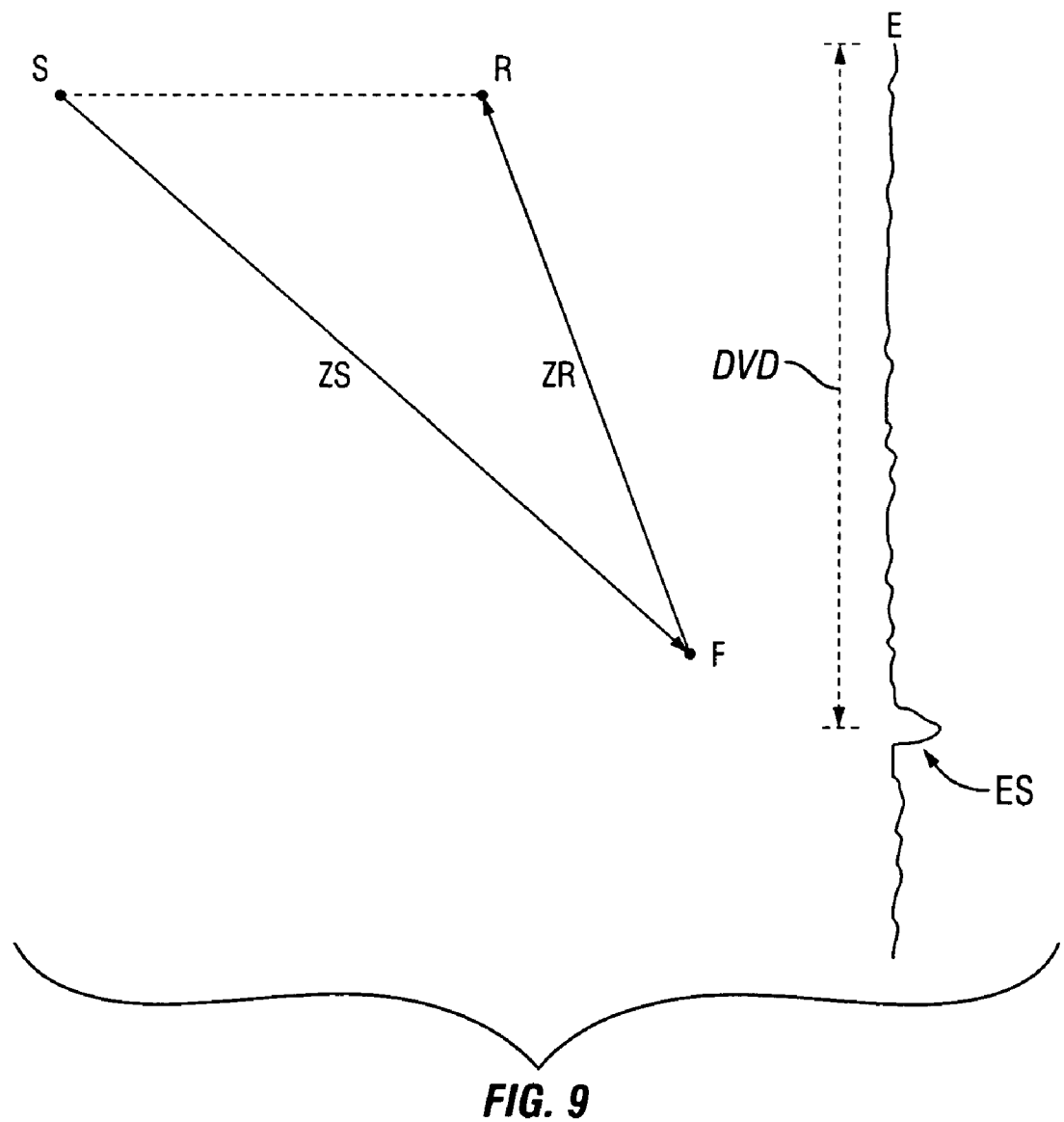
FIG. 9 illustrates a diagrammatic view of the spatial relationships relevant to selection of echo signals.

FIG. 9 illustrates a diagrammatic view of the spatial relationships relevant to selection of echo signals. Source location S represents the location of ultrasonic transmitter 2, as previously illustrated in FIG. 1. Receiver location R represents the location of ultrasonic receiver 6, as previously illustrated in FIG. 1. From these spatial locations, Zr is the distance from selected focused signal location F to receiver location R and Zs is the distance from selected focused signal location F to transmitter location S. Derived Vertical Depth DVD represents the apparent depth where an echo signal ES would appear on echo sounding E from an object occurring at or near selected focused signal location F, step 511. Echo signal ES is selected from selected echo sounding E, step 330, based on the calculated Derived Vertical Depth DVD, step 520. The process is repeated for the all of the echo soundings selected for each selected focused signal location.

Figure 10:
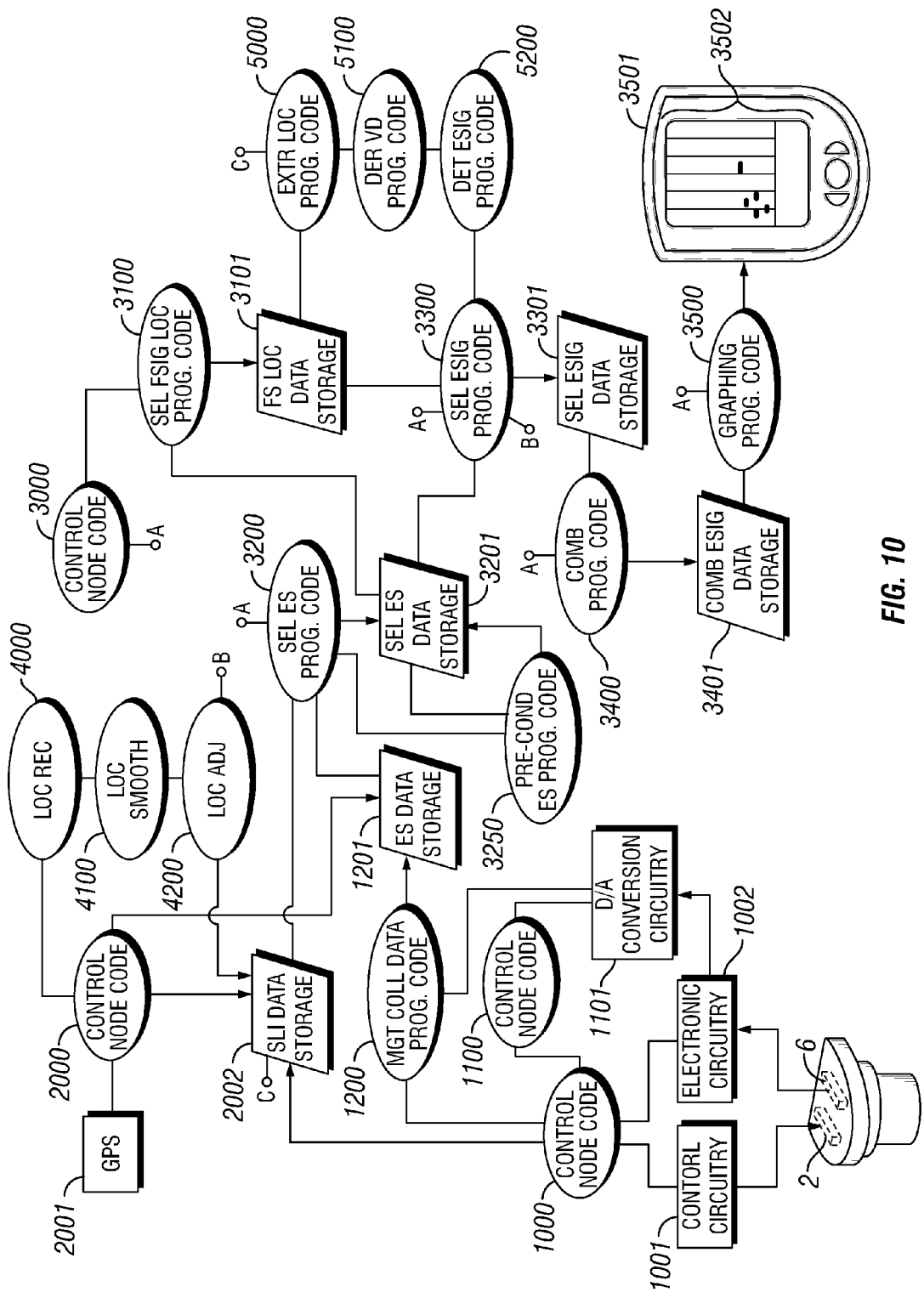
FIG. 10 illustrates a node chart schematic view of an example system for ultrasonic acoustic imaging of objects.

FIG. 10 illustrates a node chart schematic view of an example system for ultrasonic acoustic imaging of objects within a body of water. Soundings are produced by an ultrasonic transmitter 2 and detected as echo soundings by an ultrasonic receiver 6. The echo soundings contain one or more echo soundings whose measured arrival time at receiver 6 correspond to an apparent depth to some object in the water. A means for collecting the echo soundings is provided. In one example, the echo soundings are collected from receiver 6 by electronic circuitry 1002 to be used for further processing. In one example, a control node 1000 executes programming code instructions to operate control circuitry 1001 for ultrasonic transmitter 2 and/or electronic circuitry 1002. Programming code instructions are stored on a computer readable medium for access by a computer processing unit.

In one example, control circuitry 1001 controls ultrasonic transmitter 2 to provide a means for transmitting short bursts of an ultrasonic carrier wave into the water. Short bursts of ultrasonic energy provide a sharp waveform signature for easier detection and signal processing.

In another example, control circuitry 1001 controls ultrasonic transmitter 2 to provide a means for transmitting a wide-bandwidth ultra-sonic acoustic wave into the water. For example, control circuitry 1001 feeds an ultrasonic carrier modulated by a complex waveform to a piezo-electric source in ultrasonic transmitter 2. The wide-bandwidth acoustic waveform enables production of a complex waveform whose character can be used to enable detection and to provide additional signal processing options for the received echo signals.

In one example, a means is provided for converting the echo signals into digital values for storage in a computer-readable medium. Conversion circuitry 1101 converts echo signals collected by electronic circuitry 1002 into digital amplitudes representing the strength and/or waveform of the echo signal. In one example, a control node 1100 executes programming code instructions to operate conversion circuitry 1101. In one example, control node 1100 is controlled by, or is a part of, control node 1000. In one example, means for recording the digital values into a computer-readable medium is provided. Program node 1200 manages collection of the digital data from conversion circuitry 1101 for storage in data structure 1201. Data structure 1201 now contains the collected echo soundings, which, in one example, include the digital amplitudes representing the strength and/or waveform of the echo signal. The collection of echo signals from an object, across one or more echo soundings, form an unfocused image.

Spatial location information of the transmitter and receiver is collected and associated with each collected echo sounding. Means for collecting spatial location information of the transmitter and receiver is provided. The collected spatial location information is associated with each collected echo sounding. A control node 2000 manages collection and association of the spatial location information. There are several equivalent ways to make the association. In one example, GPS circuitry 2001 is used to provide the spatial locations for the transmitter and receiver, which is then associated with a particular echo sounding. In one example, an association is made by using programming code to record the time that spatial coordinates are provided by the GPS while soundings are being made. The times that the soundings are being made are also recorded, for example, in data structure 2002. In one example, control node 1000 places references to the soundings into data structure 2002. By matching, approximately matching, or interpolating the time recordings each sounding is associated with a spatial location. In another example, GPS circuitry 2001 is used to provide the spatial locations. The spatial locations are entered into the data structure 1201 of the sounding by programming code.

A means is provided for forming a focused image. Programming code is executed to form a focused image from the unfocused image of the echo signals. In one example, a control node 3000 provides programming code to oversee the forming of a focused image. Programming code is executed to select a focused signal spatial location, select one or more echo soundings from the collected echo soundings, calculate the location of echo signals on those echo soundings that correspond to the focused signal location, select and combine the echo signals from the calculated locations to form a focused echo signal, and then graph the focused echo signal on a display, based upon the focused signal location.

A means is provided for selecting a focused signal spatial location. Programming code 3100 executes to select one or more focused signal spatial locations. In one example, control node 3000 directs programming code 3100 to make the spatial location selections. The selected focused signal spatial location is defined relative to the collected spatial location information, for example data structure 1201, that is associated with the echo soundings. In one example, programming code 3100 stores the selected focused signal locations into a data structure 3101.

A means is provided for selecting one or more echo soundings from the collected echo soundings. In one example, control node 3000 directs execution of programming code 3200 to select one or more echo soundings from the collected echo soundings, data structure 1201. In one example, programming code 3200 directs storage of the selected echo soundings, or stores appropriate handles or pointers to the selected echo soundings, in data structure 3201. In one example, the echo soundings are selected based upon their relative spatial proximity to the selected focused signal spatial location. In one example, three adjacent echo soundings on either side of the selected focused signal spatial location are selected.

A means is provided for selecting an echo signal from each selected echo sounding. In one example, programming code 3300 executes to select an echo signal from each selected echo sounding, data structure 3201. The selection is determined by a calculation that determines which echo signal corresponds to the focused signal. This is based on the selected focused signal spatial location and on the collected spatial information that is associated with the selected echo sounding. The selected echo signal actually belongs at the focused signal spatial location and not at the selected location on the selected echo sounding. In one example, programming code 3300 directs storage of the selected echo signals, or stores appropriate handles or pointers to the selected echo signals, in data structure 3301. In one example, control node 3000 directs execution of programming code 3300.

A means is provided for combining the selected echo signals. In one example, programming code 3400 executes to combine the recorded amplitudes of the selected echo signals. This forms a focused echo signal. In one example, programming code 3400 directs storage of the combined echo signals, in data structure 3401. In one example, control node 3300 directs execution of programming code 3400.

A means is provided for graphing the focused echo signal based on the selected focused signal spatial location. Various levels of programming code execute to transfer the focused echo signal to a graphable data structure. In one example, this is represented by programming code 3500. Programming code 3500 converts the relative location of the focused signal location for use in graphing the locations of the several focused echo signals relative to each other on a graphic display. Information from data structure 3101, which in one example is preserved in data structure 3401, provides the spatial location information. Graphing circuitry 3501, for example, a video card and display, graphs the data structure of the focused echo signals. A focused image 3502 is produced.

In another example, additional processing of spatial location information is performed to develop the focused image. A means is provided for recording a series of times, locations, speeds, altitudes, and/or headings from a location device. In one example, GPS circuitry 2001 provides additional bearing and speed data for storage in data structure 2002 by the programming code under direction of control node 2000. In one example, this operation is performed by separate programming code 4000, either independent of control node 2000 or controlled by control node 2000. A means is provided for applying smoothing corrections to the recorded time series. Programming code 4100 applies interpolation and/or spline-fit algorithms to the collected data such that the locations of the echo soundings are calculated from the collected data. A means is provided for determining an estimated location of the transmitter and receiver for each collected echo sounding from the calculated locations. For example, programming code 4100 provides the calculated locations for adjustment by programming code 4200. The adjustment applies the known or given offset of transmitter 2 and receiver 6 from the location being tracked by GPS circuitry 2001. Programming code 4200 produces an estimated location for the transmitter and receiver. In one example, programming code 4200 stores the estimated location in data structure 2002. In another example, programming code 4200 otherwise makes the estimated location available for access by other nodes, such as programming code 3300.

The means for selecting the echo signal include use of the estimated location. For example, programming code 3300 executes to select an echo signal from each selected echo sounding, data structure 3201. The selection is determined by a calculation that determines which echo signal corresponds to the focused signal. This is based on the selected focused signal spatial location, the collected spatial information that is associated with the selected echo sounding, and the transmitter/receiver estimated location that is associated with the selected echo sounding.

In another example, a means is provided for preconditioning the echo soundings. In one example, programming code 3250 operates on the selected echo soundings, data structure 3201, to apply the preconditioning. In one example, programming code 3200 directs execution of programming code 3250. In another example, programming code 3250 is a subset of programming code 3200. There are alternate entry points for operation of the precondition calculations. In another example, programming code 3250 operates generally on the echo soundings, data structure 1201. In another example, programming code operates on the selected echo signals, data structure 3301. The specific preconditioning algorithm includes one or more of the following conditioning steps: compensating the signal strength of echo signals of the echo sounding for wave front spreading, bandpass filtering the echo sounding, and waveform shaping the echo signals of the echo sounding. In another example, means is provided for estimating the relative wave elevation associated with the collected echo sounding and means is provided for adjusting the collected spatial location information of the collected echo sounding, based on the estimated relative wave elevation.

In another example, the means for selecting an echo signal further includes determination of the echo signal to select based on a derived vertical depth. In one example, programming code 5000 extracts spatial location information from data structure 2002 and focused signal spatial location data structure 3101. A means is provided for calculating a derived vertical depth. In one example, programming code 5100 derives a vertical depth by calculating a distance (Zs) between the selected focused signal spatial location and the spatial location of the source, extracted from the collected spatial information associated with the selected echo sounding; calculating a distance (Zr) between the selected focused signal spatial location and the spatial location of the receiver, extracted from the collected spatial information associated with the selected echo sounding; calculating a derived vertical depth (DVD) based on the formula:

$$DVD = \frac{1}{2} * (Zs + Zr);$$

and determining the echo signal of the selected echo sounding having an apparent vertical depth corresponding to said calculated derived vertical depth.

Upon derivation of the derived vertical depth, a means is provided for determining the echo signal of the selected echo sounding having an apparent vertical depth that corresponds to the calculated derived vertical depth. In one example, programming code 5200 determines the echo signal to select based on the vertical depth that was derived. In one example, programming code 3300 uses the derived vertical depth information provided by programming code 5200 to select the echo signal from the echo sounding. In one example, the spatial information of the echo sounding is provided by programming code 3300 to programming code 5200. In an alternate example, the spatial information of the echo sounding is obtained by programming code 5200 directly from data structure 2002. In other examples, the spatial information of the echo sounding is provided by way of programming node 5000.

In one example, assembly of the programming code for the various programming and control nodes is obtained by incorporation of a programmable computing device. One example of a programmable computing device is a "PC" personal computer. One example of a programmable computing device is a Minotaur BF537 sub miniature computer module, distributed by Cambridge Signal Processing, United Kingdom, interfaced using a custom motherboard. In another example, GPS circuitry 2001, control circuitry 1001, electronic circuitry 1002, conversion circuitry 1101, and graphing circuitry 3501 are interfaced with a programmable computing device that incorporates the programming code and control nodes. In another example, portions or all of the programming code and control nodes are incorporated into a hardware configuration. In another example, some or all of the programming code for the various programming and control nodes are configured into independently executing hardware nodes. In another example, object coding is used to execute one or more of the programming code elements independently, based upon commands from respective control nodes and/or changes to data placed in the data structures. In one example, programming code instructions are stored on a computer readable medium for access by a computer processing unit.

The foregoing disclosure is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant in the art having the benefit of the present disclosure. Further, the embodiments described are also intended to explain the best mode for carrying out the invention, and to enable others skilled in the art to utilize the invention and such or other embodiments and with various modifications required by the particular applications or uses of the invention. It is intended that the claims based on this disclosure be construed to include alternative embodiments to the extent that is permitted by prior art.

I claim:

1. A method for ultrasonic acoustic imaging of objects within a body of water, the method comprising the steps of:
    collecting a plurality of echo soundings into a computer-readable medium using conversion circuitry, the soundings produced by an ultrasonic transmitter and detected by an ultrasonic receiver, wherein each echo sounding comprises a plurality of echo signals, the echo signals corresponding to an apparent vertical depth, thereby forming an unfocused image;
    collecting into a computer-readable medium spatial location information of the transmitter and receiver using a location device and control circuitry, wherein said collected spatial location information is associated with each collected echo sounding; and
    forming a focused image by executing programming code on a programmable computing device, further comprising the steps of:
        selecting a focused signal spatial location wherein the selected focused signal spatial location is defined relative to said collected spatial location information associated with the echo soundings;
        selecting one or more echo soundings from said plurality of echo soundings;
        selecting an echo signal from each selected echo sounding, whereby the echo signal selection is determined by a calculation of which echo signal from the selected echo sounding corresponds to a focused signal occurring at the selected focused signal spatial location, wherein said calculation is based on the selected focused signal spatial location and on the collected spatial information associated with the selected echo sounding;
        combining the selected echo signals, whereby a focused echo signal is formed; and
        graphing unto a computer display device the focused echo signal based on the selected focused signal spatial location, whereby a focused image is produced.

2. The method of claim 1 further comprising the step of:
    Transmitting a complex wave-shape ultra-sonic acoustic wave into the water.

3. The method of claim 1 further comprising the step of:
    Transmitting a wide-bandwidth ultra-sonic acoustic wave into the water.

4. The method of claim 1 wherein said step of forming a focused image further comprises the steps of:
    Recording a series of times, locations, speeds, altitudes, and headings from a location device;
    Applying smoothing corrections to the recorded series, whereby calculated locations of the location device are produced;
    Determining the location of the transmitter and receiver for each collected echo sounding from the calculated locations of the location device, whereby a determined location is produced; and
    Wherein said calculation of which echo signal from the selected echo sounding is further based upon said determined location.

5. The method of claim 1 further comprising the step of:
    Preconditioning the echo soundings.

6. The method of claim 5 wherein said step of preconditioning the echo soundings further comprises the step of:
    Compensating the signal strength of echo signals of the echo sounding for wave front spreading.

7. The method of claim 5 wherein said step of preconditioning the echo soundings further comprises the step of:
    Waveform shaping the echo signals of the echo sounding.

8. The method of claim 5 wherein said step of preconditioning the echo soundings further comprises the steps of:
    Estimating the relative wave elevation associated with the collected echo sounding; and
    Adjusting the collected spatial location information of the collected echo sounding, based on the estimated relative wave elevation.

9. The method of claim 1 wherein said step of selecting an echo signal from each selected echo sounding further comprises the steps of:
    calculating a first distance ($Z_s$) between the selected focused signal spatial location and the spatial location of the transmitter, wherein said spatial location of the transmitter is extracted from the collected spatial information associated with the selected echo sounding;
    calculating a second distance ($Z_r$) between the selected focused signal spatial location and the spatial location of the receiver, wherein said spatial location of the receiver is extracted from the collected spatial information associated with the selected echo sounding;
    calculating a derived vertical depth (DVD) based on the formula:

$$DVD = \tfrac{1}{2} * (Z_s + Z_r); \text{ and}$$

Determining the echo signal on the selected echo sounding having an apparent vertical depth corresponding to said calculated derived vertical depth.

10. A system for ultrasonic acoustic imaging of objects within a body of water, the system comprising:

Means for collecting a plurality of echo soundings, the soundings produced by an ultrasonic transmitter and detected by an ultrasonic receiver, wherein each echo sounding comprises a plurality of echo signals, the echo signals corresponding to an apparent vertical depth, thereby forming an unfocused image;

Means for collecting spatial location information of the transmitter and receiver, wherein said collected spatial location information is associated with each collected echo sounding; and Means for forming a focused image, further comprising:

Means for selecting a focused signal spatial location wherein the selected focused signal spatial location is defined relative to said collected spatial location information associated with the echo soundings;

Means for selecting one or more echo soundings from said plurality of echo soundings;

Means for selecting an echo signal from each selected echo sounding, whereby the echo signal selection is determined by a calculation of which echo signal from the selected echo sounding corresponds to a focused signal occurring at the selected focused signal spatial location, wherein said calculation is based on the selected focused signal spatial location and on the collected spatial information associated with the selected echo sounding;

Means for combining the selected echo signals, whereby a focused echo signal is formed; and Means for graphing the focused echo signal based on the selected focused signal spatial location, whereby a focused image is produced.

11. The system of claim 10 further comprising:

Means for transmitting a complex wave-shape ultra-sonic acoustic wave into the water.

12. The system of claim 10 further comprising:

Means for transmitting a wide-bandwidth ultra-sonic acoustic wave into the water.

13. The system of claim 10 wherein said means for forming a focused image further comprises:

Means for recording a series of times, locations, speeds, altitudes, and headings from a location device;

Means for applying smoothing corrections to the recorded series, whereby calculated locations of the location device are produced;

Means for determining the location of the transmitter and receiver for each collected echo sounding from the calculated locations of the location device, whereby a determined location is produced; and Wherein said calculation of which echo signal from the selected echo sounding is further based upon said determined location.

14. The system of claim 10 further comprising:

Means for preconditioning the echo soundings.

15. The system of claim 14 wherein said means for preconditioning the echo soundings further comprises:

Means for compensating the signal strength of echo signals of the echo sounding for wave front spreading.

16. The system of claim 14 wherein said means for preconditioning the echo soundings further comprises:

Means for waveform shaping the echo signals of the echo sounding.

17. The system of claim 14 wherein said means for preconditioning the echo soundings further comprises:

Means for estimating the relative wave elevation associated with the collected echo sounding; and Means for adjusting the collected spatial location information of the collected echo sounding, based on the estimated relative wave elevation.

18. The system of claim 10 wherein said means for selecting an echo signal from each selected echo sounding further comprises:

Means for calculating a first distance ($Z_s$) between the selected focused signal spatial location and the spatial location of the transmitter, wherein said spatial location of the transmitter is extracted from the collected spatial information associated with the selected echo sounding;

Means for calculating a second distance ($Z_r$) between the selected focused signal spatial location and the spatial location of the receiver, wherein said spatial location of the receiver is extracted from the collected spatial information associated with the selected echo sounding;

Means for calculating a derived vertical depth (DVD) based on the formula:

$$DVD = \frac{1}{2} * (Z_s + Z_r); \text{ and}$$

Means for determining the echo signal of the selected echo sounding having an apparent vertical depth corresponding to said calculated derived vertical depth.

19. A nontransient computer-readable medium for use with an apparatus for ultrasonic acoustic imaging of objects within a body of water, the nontransient computer-readable medium comprising:

instructions for collecting a plurality of echo soundings, the soundings produced by an ultrasonic transmitter and detected by an ultrasonic receiver, wherein each echo sounding comprises a plurality of echo signals, the echo signals corresponding to an apparent vertical depth, thereby forming an unfocused image;

instructions for collecting spatial location information of the transmitter and receiver, wherein said collected spatial location information is associated with each collected echo sounding; and instructions for forming a focused image, further comprising:

instructions for selecting a focused signal spatial location wherein the selected focused signal spatial location is defined relative to said collected spatial location information associated with the echo soundings;

instructions for selecting one or more echo soundings from said plurality of echo soundings;

instructions for selecting an echo signal from each selected echo sounding, whereby the echo signal selection is determined by a calculation of which echo signal from the selected echo sounding corresponds to a focused signal occurring at the selected focused signal spatial location, wherein said calculation is based on the selected focused signal spatial location and on the collected spatial information associated with the selected echo sounding;

instructions for combining the selected echo signals, whereby a focused echo signal is formed; and instructions for graphing the focused echo signal based on the selected focused signal spatial location, whereby a focused image is produced.

20. The nontransient computer-readable medium of claim 19 further comprising:

instructions for transmitting a complex wave-shape ultrasonic acoustic wave into the water.

21. The nontransient computer-readable medium of claim 19 further comprising:

instructions for transmitting a wide-bandwidth ultra-sonic acoustic wave into the water.

22. The nontransient computer-readable medium of claim 19 wherein said instructions for forming a focused image further comprises:
- instructions for recording a series of times, locations, speeds, altitudes, and headings from a location device;
- instructions for applying smoothing corrections to the recorded series, whereby calculated locations of the location device are produced;
- instructions for determining the location of the transmitter and receiver for each collected echo sounding from the calculated locations of the location device, whereby a determined location is produced; and
- wherein said calculation of which echo signal from the selected echo sounding is further based upon said determined location.

23. The nontransient computer-readable medium of claim 19 further comprising:
- instructions for preconditioning the echo soundings.

24. The nontransient computer-readable medium of claim 23 wherein said instructions for preconditioning the echo soundings further comprises:
- instructions for compensating the signal strength of echo signals of the echo sounding for wave front spreading.

25. The nontransient computer-readable medium of claim 23 wherein said instructions for preconditioning the echo soundings further comprises:
- instructions for waveform shaping the echo signals of the echo sounding.

26. The nontransient computer-readable medium of claim 23 wherein said instructions for preconditioning the echo soundings further comprises:
- instructions for estimating the relative wave elevation associated with the collected echo sounding; and
- instructions for adjusting the collected spatial location information of the collected echo sounding, based on the estimated relative wave elevation.

27. The nontransient computer-readable medium of claim 19 wherein said instructions for selecting an echo signal from each selected echo sounding further comprises:
- instructions for calculating a first distance ($Z_s$) between the selected focused signal spatial location and the spatial location of the transmitter, wherein said spatial location of the transmitter is extracted from the collected spatial information associated with the selected echo sounding;
- instructions for calculating a second distance ($Z_r$) between the selected focused signal spatial location and the spatial location of the receiver, wherein said spatial location of the receiver is extracted from the collected spatial information associated with the selected echo sounding;
- instructions for calculating a derived vertical depth (DVD) based on the formula:

$$DVD = \tfrac{1}{2} * (Z_s + Z_r); \text{ and}$$

- instructions for determining the echo signal on the selected echo sounding having an apparent vertical depth corresponding to said calculated derived vertical depth.

* * * * *